US012602416B2

(12) United States Patent
Sullivan et al.

(10) Patent No.: US 12,602,416 B2
(45) Date of Patent: Apr. 14, 2026

(54) HYBRID ARTIFICIAL INTELLIGENCE SYSTEM FOR SEMI-AUTOMATIC PATENT CLAIMS ANALYSIS

(71) Applicant: DAYSTROM INFORMATION SYSTEMS, LLC, San Jose, CA (US)

(72) Inventors: Stephen G. Sullivan, El Dorado Hills, CA (US); Arnold E. Brown, II, San Jose, CA (US)

(73) Assignee: Daystrom Information Systems, LLC, San Jose, CA (US)

( * ) Notice: Subject to any disclaimer, the term of this patent is extended or adjusted under 35 U.S.C. 154(b) by 209 days.

(21) Appl. No.: 18/209,475

(22) Filed: Jun. 13, 2023

(65) Prior Publication Data

US 2023/0325422 A1 Oct. 12, 2023

Related U.S. Application Data

(63) Continuation-in-part of application No. 16/998,825, filed on Aug. 20, 2020, now Pat. No. 11,699,034.

(60) Provisional application No. 62/889,156, filed on Aug. 20, 2019.

(51) Int. Cl.
| | |
|---|---|
| *G06F 16/334* | (2025.01) |
| *G06F 3/0482* | (2013.01) |
| *G06F 3/04847* | (2022.01) |
| *G06F 16/338* | (2019.01) |
| *G06F 40/279* | (2020.01) |

(Continued)

(52) U.S. Cl.
CPC ........ *G06F 16/3344* (2019.01); *G06F 3/0482* (2013.01); *G06F 3/04847* (2013.01); *G06F*

*16/338* (2019.01); *G06F 40/279* (2020.01); *G06F 40/30* (2020.01); *G06N 3/092* (2023.01)

(58) Field of Classification Search
CPC .............. G06F 16/3344; G06F 3/0482; G06F 3/04847; G06F 16/338; G06F 40/279; G06F 40/30; G06F 3/0481; G06F 3/0486; G06F 40/242; G06F 40/117; G06F 40/169; G06F 16/335; G06N 3/092; G06N 5/02; G06N 3/0455
See application file for complete search history.

(56) References Cited

U.S. PATENT DOCUMENTS

| | | | |
|---|---|---|---|
| 2021/0089971 A1* | 3/2021 | Grabau ................. | G06N 5/022 |
| 2022/0004545 A1* | 1/2022 | Arvela ................. | G06F 40/205 |
| 2022/0180317 A1* | 6/2022 | Andrews .............. | G06F 40/279 |

(Continued)

*Primary Examiner* — Stella L. Woo

(74) *Attorney, Agent, or Firm* — Stephen G. Sullivan

(57) ABSTRACT

A user interface is displayed to enable a user to initiate a search based on a selected reference document. The UI displays options that enable the user to narrow the search, and the UI receives from the user a selection of portions of the reference document to search against and any annotations. A query is submitted to find a set of patents that are similar to the reference document, and a set of matching patents is received. Text of the reference document and the annotations are input to into a ML model to determine the meanings of words in the reference document. Text of the matching patents are input to the ML model to determine meanings of words in the matching patents. The reference document is searched to find matches between the claims from the matching patents and the reference document. A ranked set of the patents is then displayed.

16 Claims, 10 Drawing Sheets

(51) Int. Cl.
_G06F 40/30_        (2020.01)
_G06N 3/092_        (2023.01)

(56)                    References Cited

U.S. PATENT DOCUMENTS

2022/0309089  A1 *    9/2022  Sutherland ............ G06F 16/353
2024/0242184  A1 *    7/2024  Williams  ........... G06Q 10/1093
2024/0338659  A1 *   10/2024  Balasubramanian  .........................
                                                   G06Q 10/103

* cited by examiner

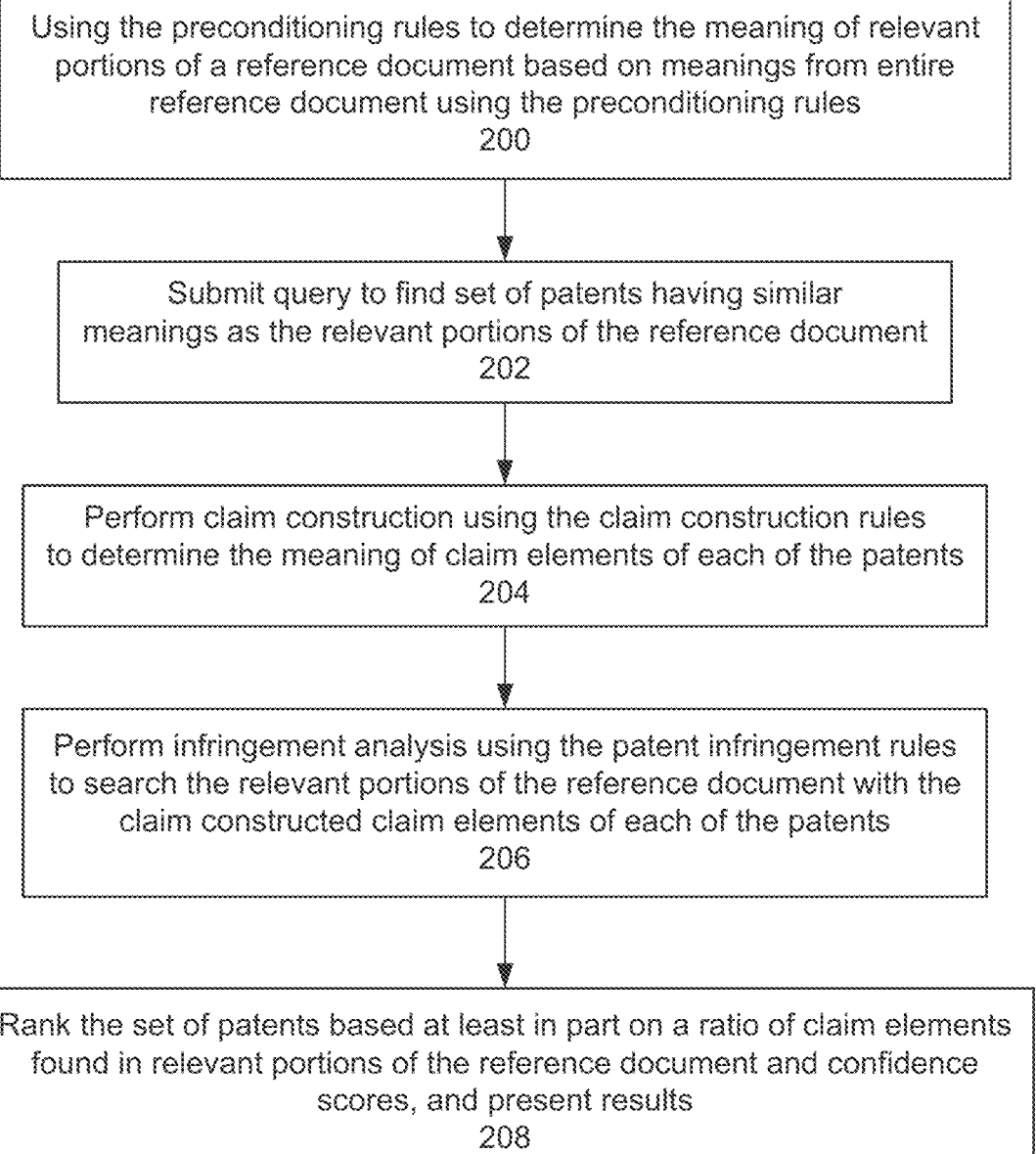

Using the preconditioning rules to determine the meaning of relevant portions of a reference document based on meanings from entire reference document using the preconditioning rules
200

Submit query to find set of patents having similar meanings as the relevant portions of the reference document
202

Perform claim construction using the claim construction rules to determine the meaning of claim elements of each of the patents
204

Perform infringement analysis using the patent infringement rules to search the relevant portions of the reference document with the claim constructed claim elements of each of the patents
206

Rank the set of patents based at least in part on a ratio of claim elements found in relevant portions of the reference document and confidence scores, and present results
208

FIG. 2A

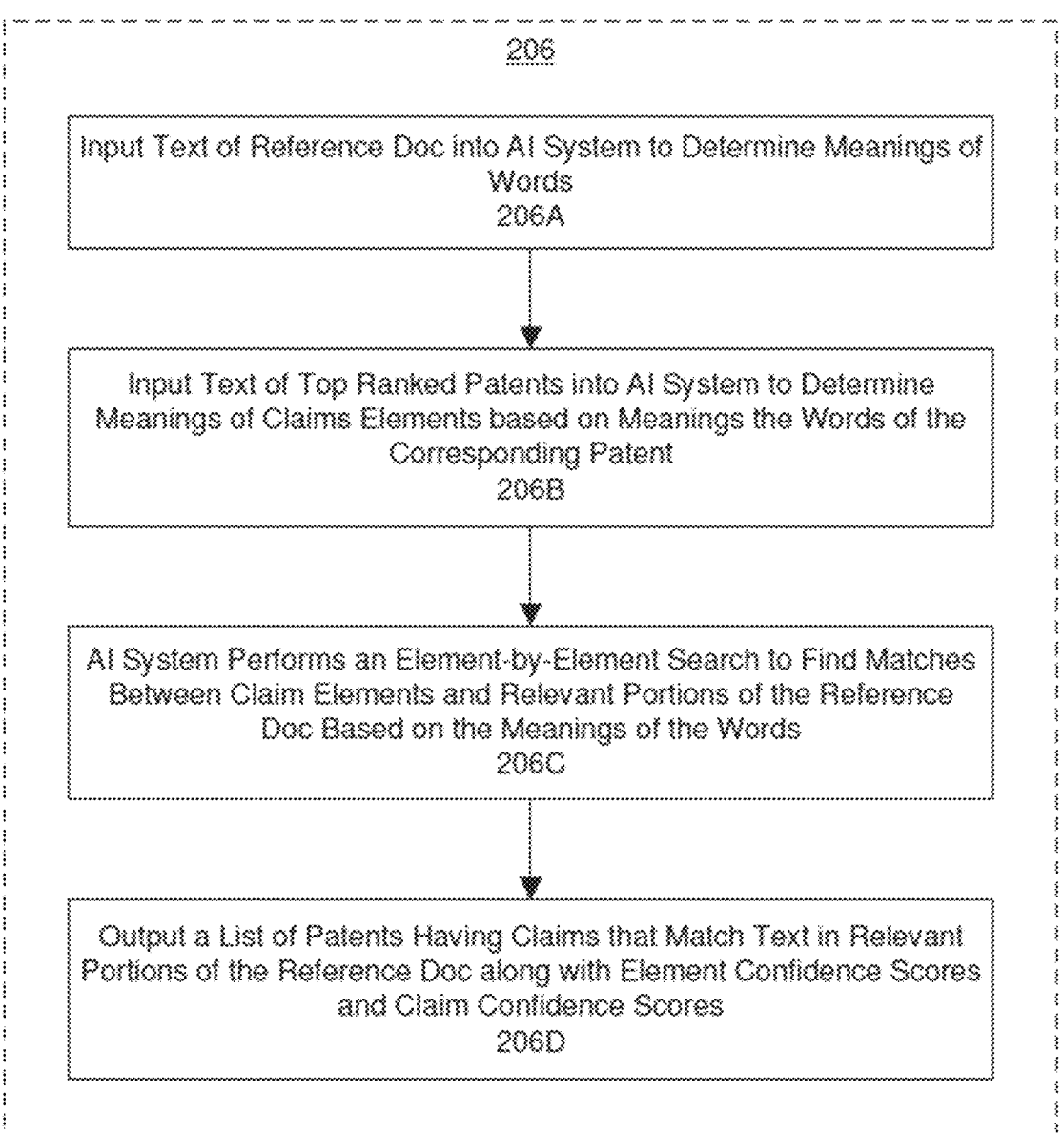

206

Input Text of Reference Doc into AI System to Determine Meanings of Words
206A

Input Text of Top Ranked Patents into AI System to Determine Meanings of Claims Elements based on Meanings the Words of the Corresponding Patent
206B AI System Performs an Element-by-Element Search to Find Matches Between Claim Elements and Relevant Portions of the Reference Doc Based on the Meanings of the Words
206C Output a List of Patents Having Claims that Match Text in Relevant Portions of the Reference Doc along with Element Confidence Scores and Claim Confidence Scores
206D

FIG. 2B

Reference Document 400

600

606a

606b

602

604

608

614

612

610

HYBRID ARTIFICIAL INTELLIGENCE SYSTEM FOR SEMI-AUTOMATIC PATENT CLAIMS ANALYSIS

CROSS-REFERENCE TO RELATED APPLICATIONS

This application is a continuation-in-part of co-pending patent application Ser. No. 16/998,825, filed Aug. 20, 2020, which is claims the benefit of provisional Patent Application Ser. No. 62/889,156, filed Aug. 20, 2019, assigned to the assignee of the present application, and incorporated herein by reference.

BACKGROUND OF THE INVENTION

Keyword searches simply find exact matches or synonym matches based on the terms or phrases in a query. Semantic searches use a semantic model learned from some domain to find semantic matches based on meaning to not only find keywords, but to determine the intent and contextual meaning of the words a person is using for search. This means that a search query may find some matches to documents that do not share any keywords from the search query but are nevertheless relevant.

Natural Language Processing, usually shortened as NLP, is a branch of artificial intelligence that deals with the interaction between computers and humans using the natural language. The ultimate objective of NLP is to read, decipher, understand, and make sense of the human languages in a manner that is valuable. Most NLP techniques rely on machine learning to derive meaning from human languages. NPL utilizes both syntactic analysis and semantic analysis. In NLP, syntactic analysis is used to assess how the natural language aligns with the grammatical rules. Semantics refers to the meaning that is conveyed by a text. Semantic analysis is one of the difficult aspects of Natural Language Processing that has not been fully resolved yet. It involves applying computer algorithms to understand the meaning and interpretation of words and how sentences are structured.

Most cognitive computing technologies described above cannot natively do the thing that makes them effective in this task: comprehend text. The only way to get past the comprehension limitation is to teach the machine. To do so requires the manual tagging of tens of thousands of documents. And that's just to have a baseline of knowledge. To improve results requires even more documents and much longer training and tuning processes. This is on top of the frustration that comes with managing a "black box," which is something that coders/user do not how it works. Although machine learning has been portrayed as cognitive and automatic, does not in reality "understand" or "learn" in autonomy. Machine learning only approximates understanding and requires a lot of time and effort to go in production.

Using a computer to understand the meaning of text is exceedingly difficult. It is even more so in the realm of patents. For years, courts have explained that a patent application is one of the most difficult legal instruments that can be drafted. For example, in 1988, the United States Supreme Court reiterated this assertion in *Laitram Corp. v. Cambridge Wire Cloth Co.* (863 F.2d 855): "[t]his appeal again illustrates one of the many difficult dichotomies that lurk in the lacunae of patent law. On one side rests the very important, statutorily-created necessity of employing the clearest possible wording in preparing the specification and claims of a patent, one of 'the most difficult legal instruments to draw with accuracy.' On the other lies the equally important, judicially-created necessity of determining infringement without the risk of injustice that may result from a blindered focus on words alone."

For understanding the meaning of patents and patent claims, machine learning technology is still insufficiently accurate to be viable solution due to the variability of each document and there is no guarantee that even massive amounts of "training" would result in correct results.

Accordingly, a new method of using AI is needed to perform patent searching.

SUMMARY OF THE INVENTION

The disclosed embodiments provide methods and systems for performing patent claims analysis. In some aspects, the techniques described herein relate to a computer-implemented method for implementing patent claims analysis by a set of instructions, which when executed by a computer causes the computer to perform operations including: displaying a user interface to enable a user to initiate a search based on a selected reference document; displaying options in the user interface that enable the user to narrow the search, the user interface operable to receive from the user a selection of one or more portions of the reference document to search against, and any tagged annotations for the reference document; submitting a query to find a set of patents that are semantical similar to the reference document; receiving a set of matching patents from the query; inputting text of the reference document and the tagged annotations into a machine learning (ML) model to determine the meanings of a first set of words in the reference document; inputting text of at least a portion of the matching patents to the ML model to determine meanings of a second set of words in the matching patents; searching the one or more portions of the reference document with claims from the matching patents to find matches between the claims and the one or more portions of the reference document based on the meanings of the first set of words and the tagged annotations, and the meanings of the second set of words; assigning confidence scores indicating a degree to which respective ones of the claims match the one or more portions of the reference document; generating a ranked set of the patents based on the confidence scores; and displaying identifiers of the ranked set of patents and the assigned confidence scores in the user interface.

In some aspects, the techniques described herein relate to a computer-implemented method for performing patent claims analysis by software component, which when executed by a computer, cause the computer to perform operations including: displaying a user interface to enable a user to initiate a search based on a selected reference document; displaying options in the user interface that enable the user to narrow a focus of the search, the user interface operable to receive from the user a selection of one or more portions of the reference document to search against, and any tagged annotations for the reference document; submitting a query to find a set of patents that are semantical similar to the reference document; receiving a set of matching patents from the query; inputting text of the reference document and the tagged annotations into a trained machine learning (ML) model to transform reference document into reference document embeddings to determine the meanings of a first set of words in the reference document; inputting text of the matching patents to the trained ML model to transform the set of matching patents, including the claim elements, into patent embeddings to determine the meanings of a second set of words in the matching patents;

for at least a portion of the patents, performing, by the trained ML model, an element-by-element search to find matches between the claim elements and the one or more portions of the reference document based on the meanings of the first set of words and the meanings of the second set of words; ranking the set of patents based on assigned confidence scores indicating a degree to which the patent embeddings of the respective claim elements match the reference document embeddings of the one or more portions of the of the reference document; and providing for viewing in the user interface a listing of the ranked set of patents, and for at least a portion of the set of patents, indications where matches occur between the claim elements and the one or more portions of the reference document.

According to the methods and systems disclosed herein, the disclosed embodiments provide an improved patent searching system that uses a combination of expert system rules, machine learning (ML) models and natural language understanding (NLU) systems to perform semi-automated patent claims analysis. Such analysis may be used to aid a patent expert's decision-making ability, preferably through a workflow. Accordingly, the system of the disclosed embodiments improves the speed and accuracy of a computer or server when performing a patent search, particularly for infringement analysis.

BRIEF DESCRIPTION OF DRAWINGS

FIG. 2A illustrates a flow diagram of a process for semi-automatic patent claims analysis according to one embodiment.

FIG. 2B illustrates a flow diagram showing further details of the processing of block 206 of FIG. 2A when searching the relevant portions of the reference document with claim elements according to one embodiment.

DETAILED DESCRIPTION OF THE INVENTION

The exemplary embodiment relates to a hybrid artificial intelligence system for semi-automatic patent claims analysis. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown but is to be accorded the widest scope consistent with the principles and features described herein.

Figure 1:
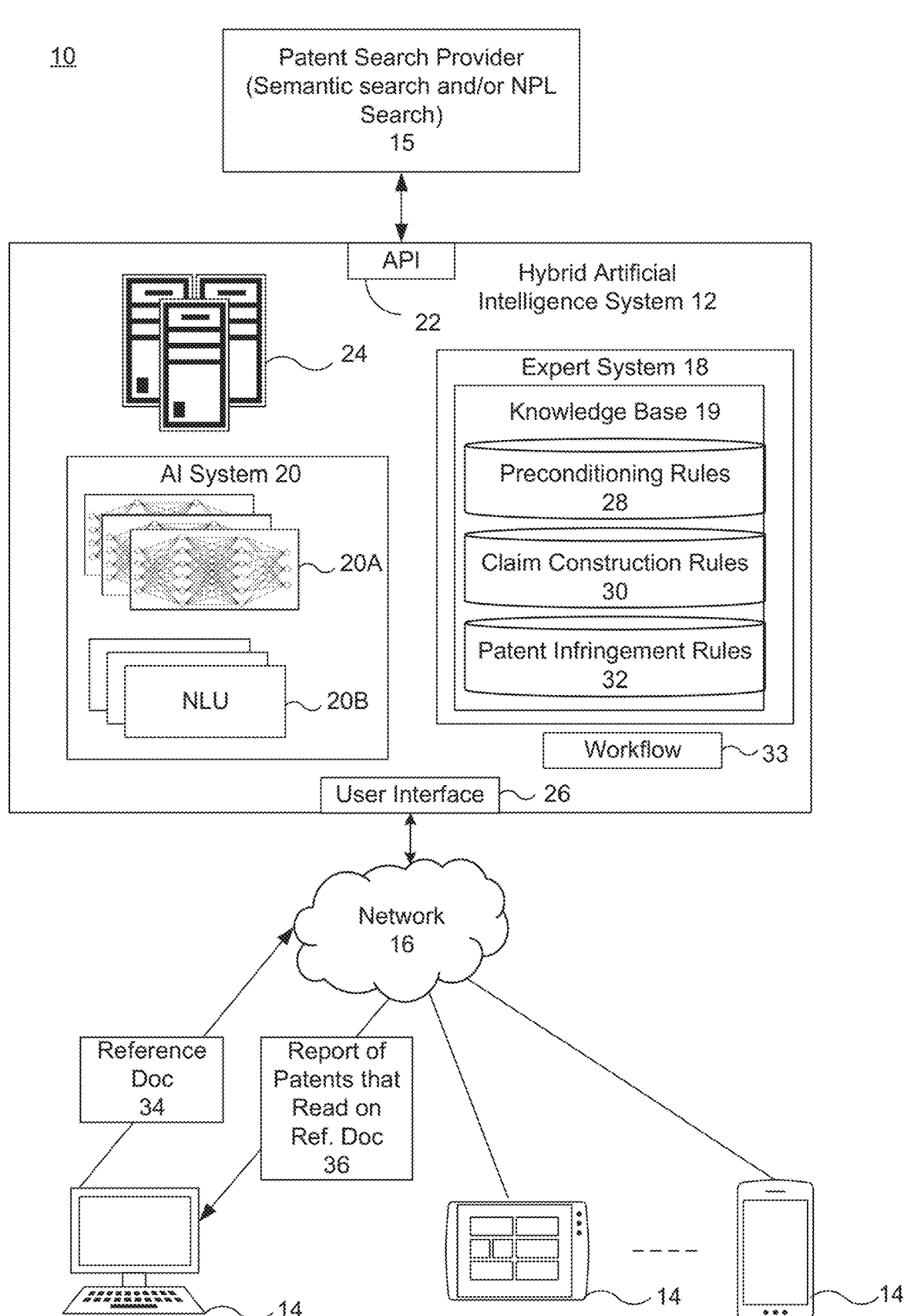
FIG. 1 is a diagram illustrating a hybrid artificial intelligence system for semi-automatic patent claims analysis.

FIG. 1 is a diagram illustrating a hybrid artificial intelligence system for semi-automatic patent claims analysis. In one embodiment, the system 10 comprises the hybrid AI system 12 in communication with a patent search provider 12 and a plurality of client devices 14 over a public or private network 16. The hybrid AI system 12 further includes one or more servers 24 that hosts the hybrid AI system 12, an expert system 18, an artificial intelligence (AI) system 20, and a user interface (UI) 26 that is displayed on the client devices 14. The hybrid AI system 12 may communicate with a patent search provider 15 through an application programming interface (API) 22, which may be provided by the patent search provider 15 or the hybrid AI system 12. In another embodiment, patent search provider 15 may be integrated tin the hybrid AI system 12.

The hybrid AI system 12 receives search requests from the client devices 14 to find patents 17 that read on a text description provided in a reference document 34. In one embodiment, the hybrid AI system 12 is implemented as a platform as a service (PaaS) or a cloud computing model in which the expert system 18 is integrated as a front-end to the AI system 20. The expert system 18 emulates the knowledge of a patent attorney using a knowledge base 19 of intellectual property (IP) law rules. In one embodiment, the knowledge base 19 comprises one or more of preconditioning rules 28, a set of claim construction rules 30, and a set of patent infringement rules 32, as explained further below.

In one embodiment, the AI system 20 may include one or more machine learning (ML) models 20A and one or more natural language understanding (NLU) systems 20B. The ML models 20A may comprise artificial neural networks (ANNs), or simply neural networks, for modelling data using a collection of nodes or artificial neurons connected by edges. The nodes and the edges typically have a weight that adjusts as learning proceeds. The weight increases or decreases the strength of the signal at a connection. Typically, nodes are aggregated into layers and different layers may perform different transformations on input signals travelling from the first layer, called the input layer, to the last layer, called the output layer, typically after traversing multiple layers.

Machine learning algorithms build a mathematical model based on sample data, known as "training data", and can then process additional data to make predictions or to make or decisions without being explicitly programmed with task-specific rules. In this case, the ML models 20A are trained using large sets of patents 17 (i.e., issued patents and patent publications).

Both the ML models 20A and the NLU system 20B are used to process text-based reference documents 34 and patents 17, and as such may make use of language models that use continuous representations or embeddings of words or phrases, where words or phrases are represented as vectors in a predefined vector space. In one embodiment, language models capable of capturing contextual representations in the text may be used (e.g., to distinguish Jaguar the animal from Jaguar the automobile). Example language models may include topic models (e.g., Latent Dirichlet Allocation) and Bidirectional Encoder Representations from Transformers (BERT). In one embodiment, language models capable of learning hierarchical text representations may be used. Poincare embeddings that compute word embeddings in hyperbolic space, rather than in Euclidean space, may be used for such purposes. An example use of a hierarchical representation is the ability to recognize that a screw and a nail are both a subset of fasteners, for instance.

The NLU system 20B is a subtopic of Natural language processing (NLP), but focuses primarily on machine reading comprehension. Like NLP, NLU uses algorithms to reduce human language into a structured ontology or knowledge graph—a collection of concepts between which relations are specified (typically as a network) and that together expresses knowledge. Syntactic analysis performed by the NLU system 20B also applies grammatical rules to groups of words in a text to derive meaning using techniques including lemmatization, stemming, morphological segmentation, word segmentation, parsing, part of speech tagging, sentence breaking and word sense disambiguation. As used herein, the phrase, an NLU system 20B is intended to include NLP techniques.

According to one aspect of the disclosed embodiments, the expert system 18 operates interactively with the AI system 20 to perform semi-automated patent claims analysis to aid a patent expert's decision-making ability, preferably through a workflow 33 and/or a series of reports displayed through the UI 26.

In operation, a reference document 34 is submitted to the hybrid AI system 12 from one of the client devices 14 to use as input for a patent search. The reference document 34 may include a description of a system, device, process or composition of matter, and the purpose of the hybrid AI system 12 is to determine whether that system, device, process or composition of matter is either taught by prior patents (i.e., a prior art or patentability search), or infringes the claims of one or more U.S. or foreign patents (i.e., an infringement search). The expert system 18 may first apply preconditioning rules 28 to the reference document 34 to narrow the focus of subsequent analysis. The conditioned reference document is submitted to the patent search provider 15 to find a set of patents that are semantically similar to the reference document 34 as determined by a conventional semantic and/or keyword search. The patent infringement rules 32 are then applied to the set of patents to find the patents having claims that "read on" the description set forth in the reference document 34. A report 36 is then presented to the requesting client device 14 through the user interface 26 of the hybrid AI system 12 listing the patents and/or the claims found to read on the reference document 43. When a patent "reads on" a reference, the system, device, process or composition of matter described in reference document can be said to infringe the claims of the patent.

Prior to using the AI system 20 to perform queries or searches against reference document, any ML models in the AI system must be implemented and trained. According to a further aspect of the disclosed embodiments, rather than training one large ML model to process queries against the reference document, a set of different ML models are created and trained based on different technological domains.

Domains may refer to specific technology groupings based on common subject matter, such as semiconductors, a network communication protocol, display devices, cancer treatments, software security, and the like. In one embodiment, at least one ML model 20A may be created for respective technology domain. The ML model 20A for a given domain is used to process a patent query for a reference document associated with that domain.

Each ML model 20A is trained by a dataset of a domain, and the name of the ML model describes the domain from which the data et was derived. For example, the ML model for an "Electric Vehicles" domain is trained using a specific dataset related to the words, phrases, concepts and language associated with the technological domain of electric vehicles. In one embodiment, the dataset may comprise documents, such as patents and other technical literature. In one embodiment. The ML model of each global domain may be trained using thousands of patents (e.g., 2000 to 10,000).

In one embodiment, the AI system 20 may be implemented with a plurality of base or global domains integrated into the AI system 20, and an option displayed through the UI for the user to create custom domains that can be created at any time. The purpose of providing different global domains is to provide better search results, since a given reference document will be processed using words or phrases from a data set to which the reference document pertains. This is in contrast with processing the search using a single ML model that was trained from a huge set of patents obtained from many different technical categories, most of which are irrelevant to a particular reference document.

In one embodiment, the datasets for training the global domains may be based on patents from a combination of one or more patent classification codes. Example types of patent classification codes include IPC (International Patent Classification) codes, USPC (U.S. Patent Classification) codes, CPC (Cooperative Patent Classification) codes, and the like. In one embodiment, the AI system 20 may include ML models corresponding to ten or more domains. For example, in one embodiment the AI system 20 may include 10-25 global domains and corresponding ML models. Below, Table I is a list showing representative technologies associated with 18 example global domains.

TABLE I

| DOMAIN NAME | REPRESENTATIVE TECHNOLOGY CONCEPTS |
|---|---|
| Automotive Technology | vehicular communications, autonomous vehicles, and vehicle sensors |
| Blockchain and Decentralized Technology | blockchain, metaverse, and authentication technology |
| Computing Technology | computer architecture, processors, and quantum computing |
| Content Protection | digital rights management, copy protection, and cryptography |
| Digital Audio Technology | audio coding, voice detecting, digital audio broadcasting |
| Digital Video Technology | video compression, video storage and memory, digital video broadcasting |
| Display Technology | liquid crystal, organic light emitting diodes, plasma |
| Electric automotive vehicle | chargers, energy storage, electric vehicle |
| Gene-based Technology | gene therapy, CRISPR, gene-based software |
| Health Technology | medical informatics, internet healthcare service, surgical robots |

TABLE I-continued

| DOMAIN NAME | REPRESENTATIVE TECHNOLOGY CONCEPTS |
|---|---|
| Internet of Things | wearable devices, home automation, lighting technology |
| Internet Technology | network security, identity management, anti-malware |
| Location Technology | location services, GPS, satellite communications |
| Mobile Devices | wireless communication, flash memory, human interface |
| Optical Technology | light-emitting diode, optic communications, photonic technology |
| Security Technology | credit card payment processing, distributed secure networks, radio frequency identification |
| Telecommunications and Cellular Networks | mobile telecommunications, base station system, radio equipment |
| Virtual Reality | augmented reality, magnetic field sensor, microelectromechanical |
| Wired Interconnect Technology | electrical interface, serial deserialization, virtualization |

Prior to running a query against the reference document, the AI system 20 uses one of the ML models corresponding to the technology domain that is most closely related to the technology domain of the reference document. In one embodiment, the AI system 20 can automatically select one of the domains/ML models based on the content of the reference document. In another embodiment, the user can select one of the domains/ML models to process the query. For example, prior to running a query against the reference document, the AI system 20 can display in the user interface a list of technology domains and then receive user selection of a particular technology domain that the system will use to process the query.

The AI system 20 may further include the ability to update the domains with a periodicity that corresponds to a frequency with which there is significant turnover in the data set related to the corresponding domain. For example, this could be a once-a-year updating of the global domains. New global domains can be added as necessary.

Custom domains may be trained using less data to train the ML model compared to a global domain. According to one embodiment, patent data may be used to train a new custom domain based upon information pulled from the reference document. To create a custom domain, the AI system 20 may display a "Create Custom Domain" page for user selection a reference document. The AI system 20 then analyzes the content of the reference document and creates a data set of patents related to the content to train a new domain. Once created, the custom domain can be used in the same way as a global domain and will appear in a list of available domains displayed in a "Patent Query" page for selection. Custom domains can be useful if there does not appear to be a global domain on topic, or in the event that a specific reference document may contain concepts or terms that are unique relative to the rest of a field or industry. The AI system 20 may display custom domains in the patent query page along with the global domain for selection. The AI system 20 may provide each user with an option of keeping a created custom domain secret for personal use or to make the custom domain viewable and usable by others (e.g., coworkers of an enterprise) so other users can see and select the custom domain when running queries.

In one embodiment, the expert system 18, the AI system 20, the API 22, and the user interface 26 are implemented as software components. In another embodiment, these components could be implemented as a combination of hardware and software. Although the expert system 18, the AI system 20, the API 22, and the user interface 26 are shown as separate components, the functionality of each may be combined into a lesser or greater number of modules/components. In addition, although a server 24 is shown hosting the hybrid AI system 12, the hybrid AI system 12 may be run on any type of one more computers that have memory and processor.

Both the server 24 and the client devices 14 may include hardware components of typical computing devices (not shown), including a processor, input devices (e.g., keyboard, pointing device, microphone for voice commands, buttons, touchscreen, etc.), and output devices (e.g., a display device, speakers, and the like). The server 24 and client devices 14 may include computer-readable media, e.g., memory and storage devices (e.g., flash memory, hard drive, optical disk drive, magnetic disk drive, and the like) containing computer instructions that implement the functionality disclosed when executed by the processor. The server 24 and the client devices 14 may further include wired or wireless network communication interfaces for communication over the network 16. Example types of client devices 14 include PC's, notebooks, tablets, mobile phones and wearable devices such as smart watches.

Although the server 24 is shown as a single computer, the functions of server 24 may be distributed over more than one server, and the functionality of software components may be implemented using a different number of software components. For example, the expert system 18 may be implemented as more than one component. In an alternative embodiment (not shown) the expert system 18, the AI system 20, and/or the UI 26 may be implemented as a standalone application that runs on the client devices 14. For example, the hybrid AI system 12 may be implemented as an iOS app that includes Core ML to implement the AI system 20.

FIG. 2A illustrates a flow diagram of a process for semi-automatic patent claims analysis according to one embodiment. The process may begin after the hybrid AI system 12 receives a search request from a client device 14 and a user selection of the reference document 34. The hybrid AI system 12 then uses the preconditioning rules 28 to determine relevant portions of the reference document 34 to narrow the focus of subsequent analysis (block 200). In one embodiment, the preconditioning process may include determining which portions of the reference document 34 are relevant to the user's search, and which can be ignored. For example, the preconditioning rules 28 may be used to exclude figures and tables from the reference document. In one embodiment, the process may also include resolving the meanings of any acronyms found in the reference document 34 based on the reference document 34 itself or by querying third-party sources. In a further embodiment, the process may include receiving from the user annotations for the reference document 34 that provide further definitions or otherwise indicate text that is weighted higher during searching. In one embodiment, the preconditioning process may constitute a first level of analysis.

In one embodiment, the hybrid AI system may display a user interface that displays options to enable the user to narrow the search. The user interface may receive from the user a selection of one or more portions of the reference document to search against, and any tagged annotations for the reference document, where tagged annotations may refer to added definitions and the weights applied to selected text from the reference document.

The hybrid AI system 12 submits a query to find a set of patents that are semantically similar to the reference document (block 202). In one embodiment the query is submitted to the search provider 15. However, in another embodiment, the functions of the patent search provider 15 may be incorporated into the hybrid AI system 12 in which case the hybrid AI system 12 performs patent search. In one embodiment, the search provider 15 performs a conventional keyword or semantic search. In one embodiment, only the matching patents having a rank or confidence score above a predefined threshold (e.g., greater than 50%) may be selected for further analysis. This initial patent search may constitute a second level of analysis.

The hybrid AI system 12 receives a set of matching patents from the query and performs claim construction on claims of the patents using the claim construction rules 30 to determine how the meaning of claim elements of the patents will be ascertained (block 204). According to one aspect of the disclosed embodiments, the claim construction rules 30 may be based on legal statues/codes/case law of different countries that may be selectable by the user. For example, the user may have the option to select U.S. statutes and case law or statutes and case law from other countries. The hybrid AI system 12 may also enable user to select from different case law holdings, e.g., whether the preamble should or should not be analyzed during claim construction. The claim construction rules 30 may be stored in the knowledge base 19 or other type of database or table. In embodiments, the claim construction rules 30 may be stored as settings that may have default values. In another embodiment, the default values may be hardcoded into the software the hybrid AI system. For example, the claim construction rules 30 may default to US patent law, and may analyze the patents "as is," i.e., without additional claim construction rules. If the defaults are unchanged, no user input is necessary. The claim construction process may constitute a third level of analysis.

After claim construction, the hybrid AI system 12 performs infringement analysis using the patent infringement rules 32 and the AI system 20 to search the relevant portions of the reference document with the claim constructed claim elements of the patents returned from the search (block 206). According to one aspect of the disclosed embodiments, the patent infringement rules 32 are also based on legal statues/ codes/case law. According to the disclosed embodiments, the patent infringement rules 32 may be based on legal statues/codes/case law that may be selectable by the user. For example, the user may have the option to select U.S. statutes and case law or from other countries. The hybrid AI system 12 may also enable the user to select from different case law holdings or doctrines, e.g., whether to apply or not to apply the doctrine of equivalents during the patent infringement analysis. The patent infringement rules 32 may be stored in the knowledge base 19 or other type of database or table. The infringement analysis may constitute the fourth level of analysis.

The hybrid AI system 12 may then rank the set of patents based on assigned confidence scores indicating a degree to which respective claim elements match the relevant portions of the reference document, and presents the results to the request client device 14 (block 208). In one embodiment, the results may be presented in the workflow 33 or other report listing the set of patents with claim element confidence scores, claim confidence scores, and/or overall patent confidence scores. In one embodiment, the confidence scores may be generated by the AI system 20, the hybrid AI system 12, or a combination of both. In an embodiment, the results may also include an indication where the claim elements match text in the reference document, e.g., by highlighting the claim elements in one window and highlighting matching the text in another window. In the embodiment where the results are displayed in the workflow 33, hybrid AI system 12 may allow a user, e.g., attorneys or patent experts, to tag (correct) the report, and input the tagged report to the AI system 20 for further training of the AI system 20 so that the hybrid AI system 12 learns over time.

FIG. 2B illustrates a flow diagram showing further details of the processing of block 206 of FIG. 2A when searching the relevant portions of the reference document with the claim elements according to one embodiment. The search process may include inputting text of the reference document 34 into the AI system 20 to determine the meanings of the words in the reference document 34 (block 206A). In one embodiment, the text of the reference document 34 is input to a ML model 20A trained with data from a technology domain of that of the reference document. The ML model 20A transforms the text of the reference document into reference document embeddings to determine the meanings of the words in the reference document. Note that the entire reference document 34 is used in this step rather than just the relevant portions for better contextual understanding. In one embodiment, the text of the reference document 34, an identification of the relevant portions, and any user annotations are input to the AI system 20.

The text of the top ranked patents returned from the patent search are also input to the AI system 20 to determine the meanings of the claim elements based on the meanings of the corresponding patent (block 206B). In one embodiment, the hybrid AI system 12 may parse each of the patents to extract the specification and to extract claims therein, and passes those to the AI system 20 with the corresponding patent identifier (e.g., a patent number). In another embodiment, the AI system 20 may perform the parsing. In one embodiment, the text of the top ranked patents is input to the same ML model 20A used to process the text of the reference document 34. The ML model 20A transforms the text of the matching patents, including the claim elements, into patent embeddings to determine the meanings of the words in the matching patents.

In one embodiment, claim elements of each of the claims may be extracted as a sentence-like phrase that ends with a colon or semi-colon. In another embodiment, the claim elements may be extracted as nouns, as adjective and noun phrases, or as adjective, noun and verb phrases in the claim. Blocks 206A and block 206B as described above are order independent.

According to one aspect of the disclosed embodiments, the AI system 20 performs for each of the patents an element-by-element search to find matches between the claim elements and the relevant portions of the reference document based on meanings of words in both the texts (block 206C). In one embodiment, the AI system 20 uses the ML model 20A, the NLU system 20B or both, to perform for each of the patents an element-by-element search. The claim elements may be matched to text of the reference document at various levels, such as at word-level, phrase-level, sentence-level, paragraph-level, or section/chapter-level). The patent infringement rules are used to guide the search performed by the AI system 20 to determine, for example, whether the preamble of the claims is considered a claim element that is searched for in the relevant portions of the reference document. In one embodiment, the AI system 20 searches the portions of the reference document with the claims from the matching patents to find matches between the claims and the portions of the reference document based on the meanings of the words and the tagged annotations in the reference document, and the meanings of the words from the matching patents.

The AI system 20 then outputs a list of patents having claims elements that match the text of the relevant portions of the reference document along with element confidence scores and claim confidence scores (206D). The element confidence scores and the claim confidence scores are based on a degree of similarity. The confidence scores may indicate the degree to which respective ones of the claims match portions of the reference document. The claim confidence scores may be a sum, average or other function of the element confidence scores within a claim. For example, the claim confidence score may be based on the highest element score from in the corresponding claim, or the claim confidence score may be based on average of the element scores. A patent confidence score may also be generated as a function of individual claim confidence scores within a patent. In one embodiment, identifiers (e.g., patent numbers and/or titles) of the ranked set of patents and the assigned confidence scores are displayed in the user interface.

In embodiments, the text of the reference document and the text of the patents are input to the ML model 20A and the NLU system 20B in parallel for an ensemble approach where the claim element confidence scores and patent confidence scores output by each are combined to form final claim element confidence scores and final patent confidence scores for each patent. In another embodiment, the text of the reference document and the text of the patents are input to the ML model 20A and the NLU system 20B serially, where the output of one is used as input to the other. In one embodiment, the AI system 20 may make use of multiple the ML models 20A and multiple NLU systems 20B.

In one embodiment, the AI system 20 is integrated with the hybrid AI system 12, as shown in FIG. 1. However, in another embodiment, the ML model 20A or the NLU system 20B of the AI system 20 may be provided by a third-party service and called, for example, through a Representational state transfer (REST) application programming interface (API).

Figure 3:
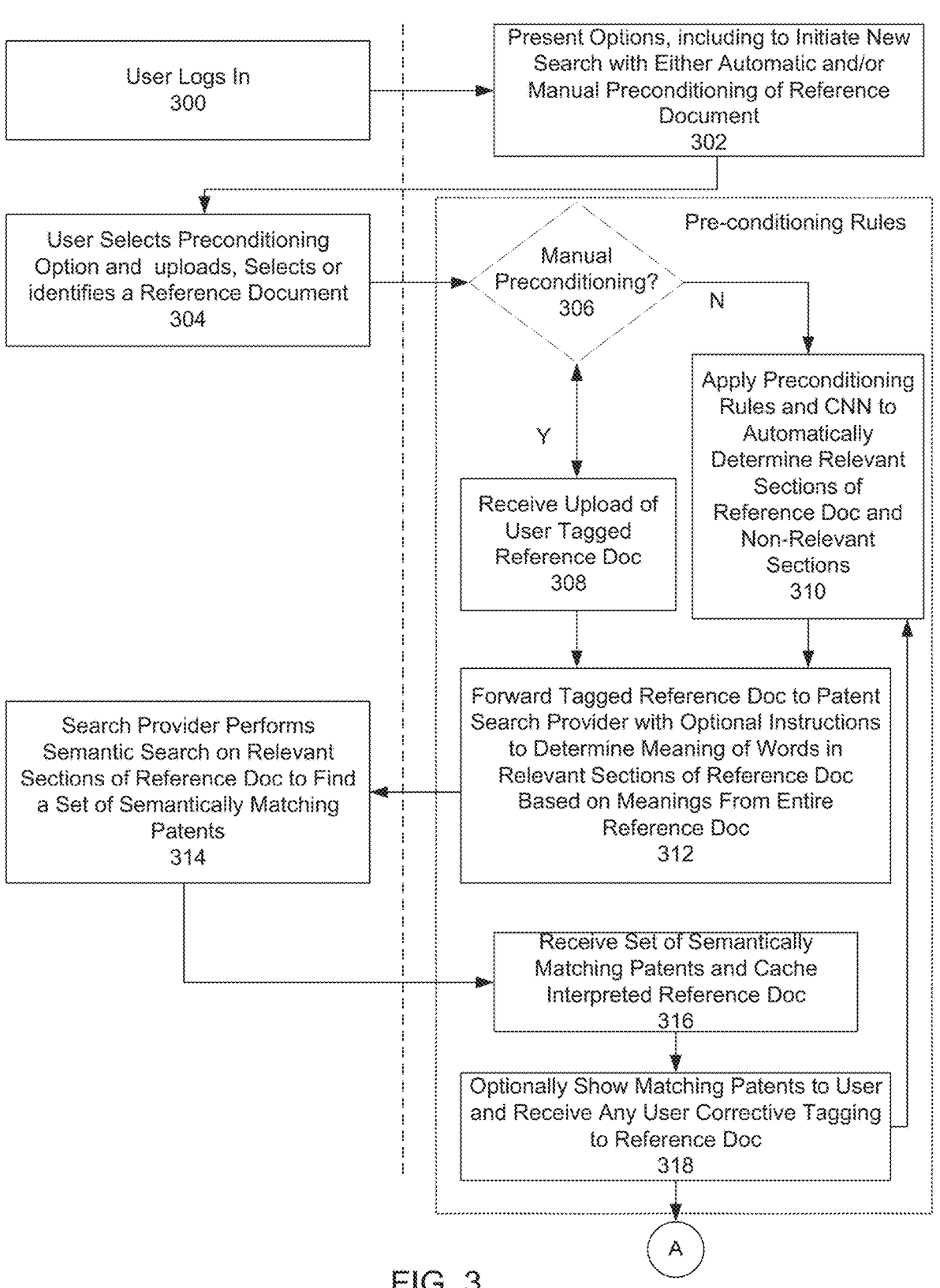
FIG. 3 is a flow diagram illustrating the process performed by the hybrid AI system in further detail to achieve an element-by-element claim analysis according to one embodiment.
Figure 3:
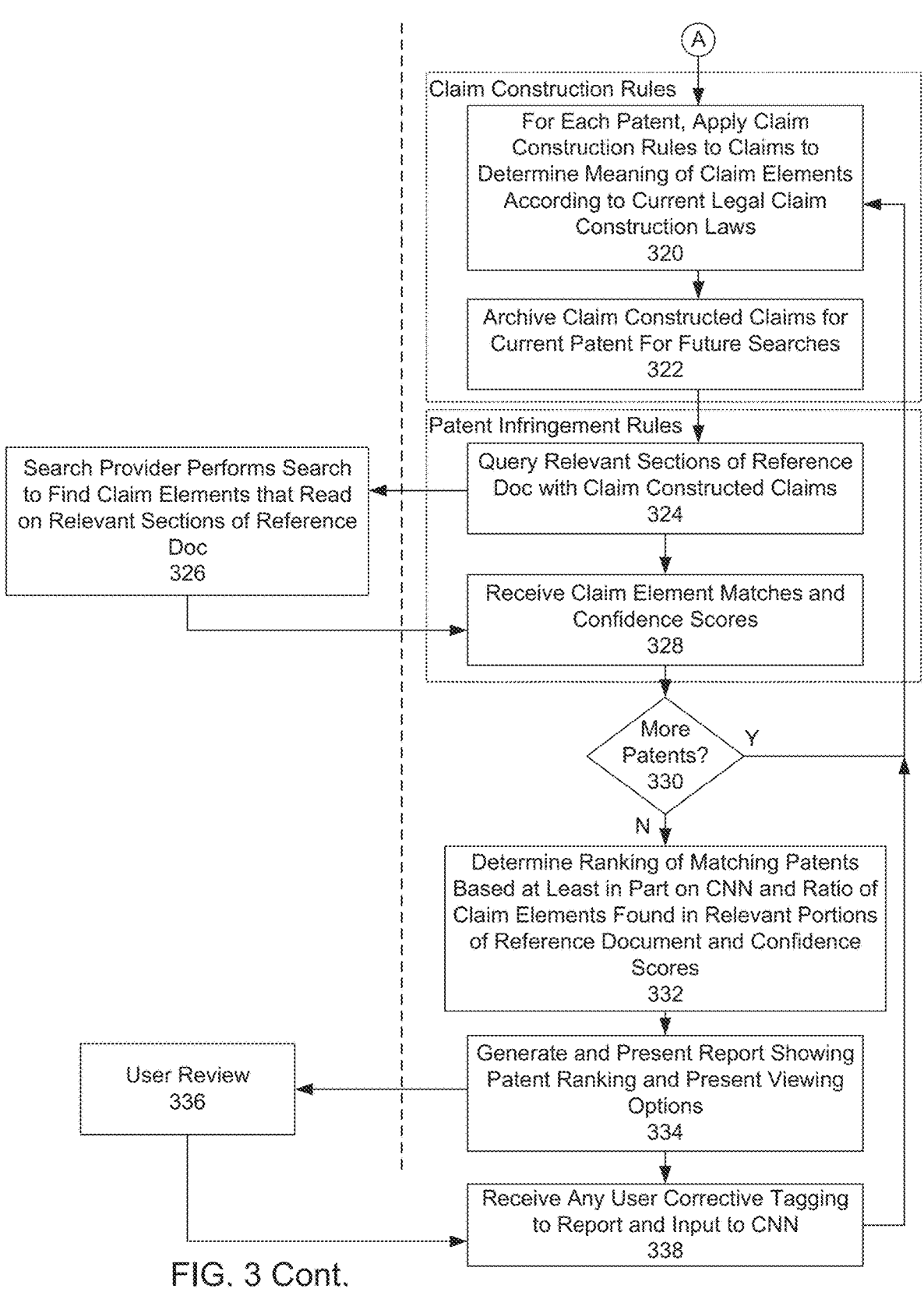

FIG. 3 is a diagram illustrating the process performed by the hybrid AI system 12 in further detail to achieve an element-by-element claim analysis. The process may begin when the user logs in (block 300), and the hybrid AI system 12 presents options including the initiating a search with either automatic and/or manual preconditioning of the reference document (block 302). The user selects one or both of the preconditioning options, and uploads, selects or identifies a reference document (block 304). With manual preconditioning, the user may select relevant portions of the reference document and/or tag the reference document with annotations.

The hybrid AI system 12 determines whether the preconditioning has been selected (block 306). If so, the system 12 receives the upload of the user tagged reference document (block 308). If not, the system 12 tags the reference document by automatically applying the preconditioning rules 28 and optionally a machine learning component to automatically determine relevant sections of the reference document and non-relevant sections (block 310). The system 12 forwards the tagged reference document to the patent search provider 15 (block 312). The search provider 15 performs a traditional semantic search on the relevant sections of the reference document and provides a set of semantically matching patents (block 314).

The hybrid AI system 12 receives the set of semantically matching patents with match scores and caches the results for future searches and faster responses (block 316). The hybrid AI system 12 optionally shows the set of matching patents to the user and optionally receives any user corrective tagging to the reference document in response (block 318). The hybrid AI system 12 then applies claim construction rules 30 according to current legal claim construction laws to the claims of the patents having a match score above a predetermined threshold (block 320). The claim constructed claims may be optionally cached for future searches and faster responses (block 322).

The hybrid AI system 12 queries the AI system 20 with the relevant sections of the reference document 34 and the claim constructed claims (block 324). The AI system 20 then finds claim elements from the claim constructed claims that read on the relevant sections of the reference document (block 326). The hybrid AI system 12 receives the claim element matches and confidence scores from the AI system 20 (block 328).

If there are no more patents to process (block 330), the hybrid AI system 12 determines the rankings of the matching patents based at least in part on the ratio of the claim elements found in the relevant portions of the reference document and confidence scores (block 332). The system 12 generates and presents the report showing the patent rankings and presents the report with viewing options to the requesting user (block 334). The user reviews the report, selects any viewing options, and provides any corrective tagging (block 336). Finally, the system 12 receives the corrective tagging made to the report and inputs the tagged report to the AI system 20 for reinforced learning (block 338).

Figure 4A:
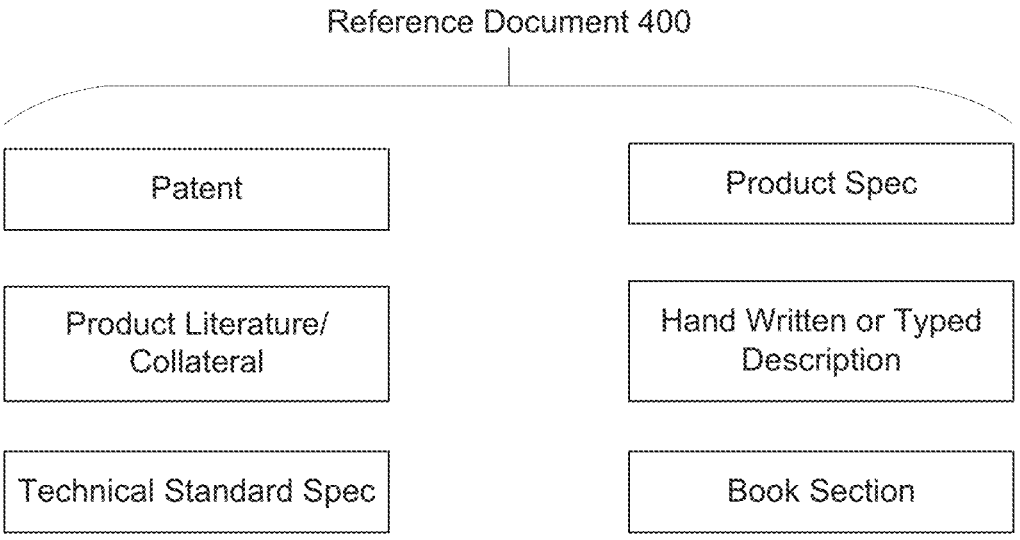
FIG. 4A is a diagram illustrating an example types of reference document that may be input to the system.

FIG. 4A is a diagram illustrating an example types of reference document 400 that may be input to the system 12. In one embodiment, example types of reference documents include, but are not limited to, a patent publication, a product specification, product literature/collateral, a written or typed description, a technical standard specification, or a book section.

Figure 4B:
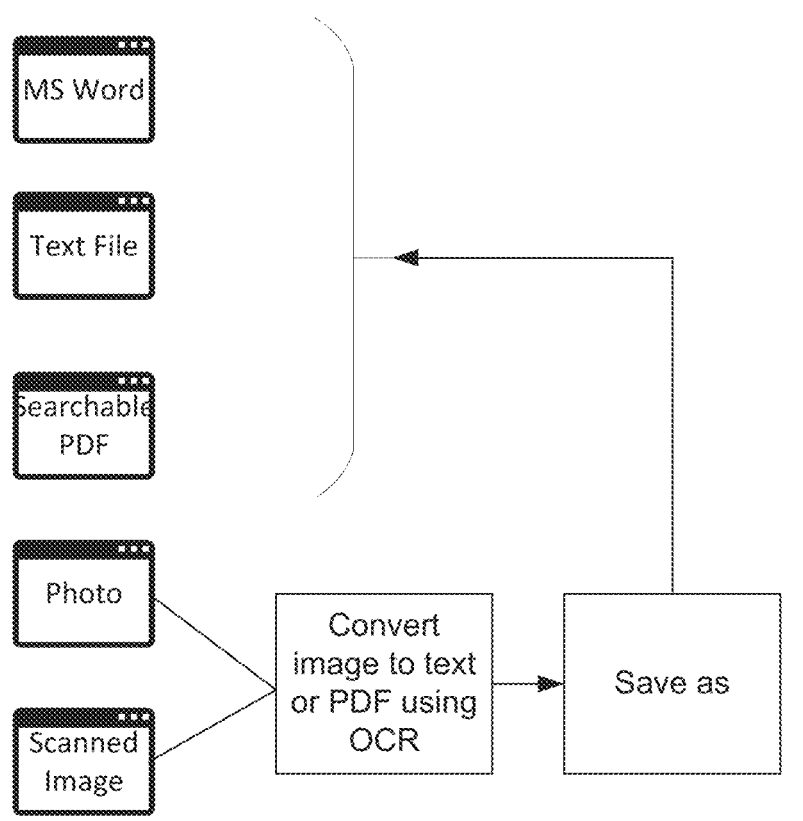
FIG. 4B is a diagram illustrating example file formats of the reference document accepted by the system.

FIG. 4B is a diagram illustrating example file formats of the reference document accepted by the system 12. In one embodiment, examples of acceptable file formats include, but are not limited to, MS Word, text file, searchable PDF, a photo, and a scanned image. In the case where the reference document is text or a scanned image of text, the system 12 may automatically convert the image to text using optical character recognition (OCR) and then store the recognized text in a file in any of the acceptable file formats.

As an example use case, consider the embodiment where the hybrid AI system 12 is implemented as a standalone application executing on a mobile device. The AI system 20 of the hybrid AI system 12 may be local on the mobile device using, for example, CoreML for iOS by Apple Inc®. Consider further that the user is attending the Consumer Electronics Show (CES) and sees a demo of a product that the user suspects infringes one of his patents. Using the application, the user can take a photo of a product flyer for the product through the application. The application performs OCR on the photo and uses the recognized text as the reference document. The application then searches for patents having claims that read on the reference document and informs the user of the results in substantially real time. As another example, the system 12 may be used to identify standards essential patents (SEPs) by inputting a technical standard specification into the system 12 to find patents that read on the technical standard.

The following is a description of legal principles that may be encoded by the claim construction rules 30 and the patent infringement rules 32. The hybrid AI system 12 performs a two-step inquiry. First, the claim construction rules 30 may construe or interpret the meaning of the particular claim terminology. Second, the patent infringement rules 32 may compare the properly construed claim to the reference document to determine whether there is literal infringement or optionally infringement under the doctrine of equivalents.

Claim Construction Rules 30

For each patent in the set of patents, find the claims numbered and located at the end of the patent. For each claim, assign to words in the claim their ordinary and customary meaning, which is the meaning that the term would have to a person of ordinary skill in the art in question at the time of the invention, i.e., as of the effective filing date of the patent application by application of the widely accepted meaning of commonly understood words. Optionally, query public sources that show what a person of skill in the art would have understood disputed claim language to mean. Those sources include the words of the claims themselves, the remainder of the patent specification, the patent prosecution history, and extrinsic evidence concerning relevant scientific principles, the meaning of technical terms, and the state of the art. If the meaning of a word or phrase is still ambiguous, prompt the user for information to aid in determining the correct meaning of the language employed in the patent. Determine if the claim language is drafted in means-plus function form, "means for . . . ," and limit the meaning of means-plus-function phrases in claims to the corresponding structure described in the specification and equivalents thereof.

Patent Infringement Rules 32

Determine a finding of literal infringement when each and every claim element of a particular claim is found in the relevant portions of the reference document. For open-ended claims containing the word "comprising" in the preamble, disregard if the reference document describes elements in addition to the ones specified in the claim. To determine if a means-plus-function limitation is literally infringed, determine if the reference document describes the identical function required by the limitation and incorporates the structure disclosed in the patent specification, or its substantial structural equivalent, as the means for performing that function. Count the ratio of claim elements found in the reference document to calculate claim confidence score, or calculate element confidence scores for each of the claim elements in the claim and then average all the element confidence scores to derive a claim confidence score. Display the matching patents sorted by highest confidence scores.

The Doctrine of Equivalents

If the reference document does not literally infringe a patent claim, determine if the reference document infringes under the doctrine of equivalents by determining whether each claim element has a counterpart in the reference document. If so, determine the relationship between the combination claimed and the components of the reference document, element-by-element. Determine whether the differences between the reference document and the claim elements are insubstantial by: determining whether a missing substitute element in the reference document matches the function, performs the recited function in the same way, and obtains the same result as the claimed element. Determine whether the substitute element plays a role substantially different from the claimed element, and if not, determine there is infringement under the doctrine of equivalents.

Otherwise, determine the differences are not insubstantial, and that is there is no infringement under the doctrine of equivalents.

If infringement under the doctrine of equivalents is found, limit the doctrine to (1) not cover an accused device in the prior art, and (2) allow the patentee to recapture through equivalence certain coverage given up during prosecution. Search the prosecution history for an amendment made during prosecution that narrows the scope of a claim to satisfy a requirement of the Patent Act. If found and there is no explanation for the reason for the amendment, use prosecution history estoppel to bar the application of the doctrine of equivalents as to the amended element.

Example User Interface (UI)

The hybrid AI system 12 is a patent analysis application designed to find patent claims reciting limitations that are closely related to content in a given reference document. At a high level, the workflow of the application proceeds as follows: 1) The system 12 displays in the UI 26 a "Reference Document" page, which prompts the user to upload a reference document or to select a reference document. 2) The system 12 ingests the reference document selected by the user, extracts the text and attempts to separate the document into its constituent sections. 3) The UI 26 displays a "New Query" page that allows the user to form a patent query against the extracted text of the document. 4) The system 12 retrieves patents based on the query, uses a machine learning engine to "score" how closely each independent claim of the retrieved patents matches the text of the reference document, and displays the patents in a "query results page" in descending order of their score. 5) The user can then examine the results from the query results page, by viewing details about any particular claim, providing feedback about each claim or patent by up voting or down voting the results for reinforced learning, and generating a PDF or CSV report of the results.

Figure 5:
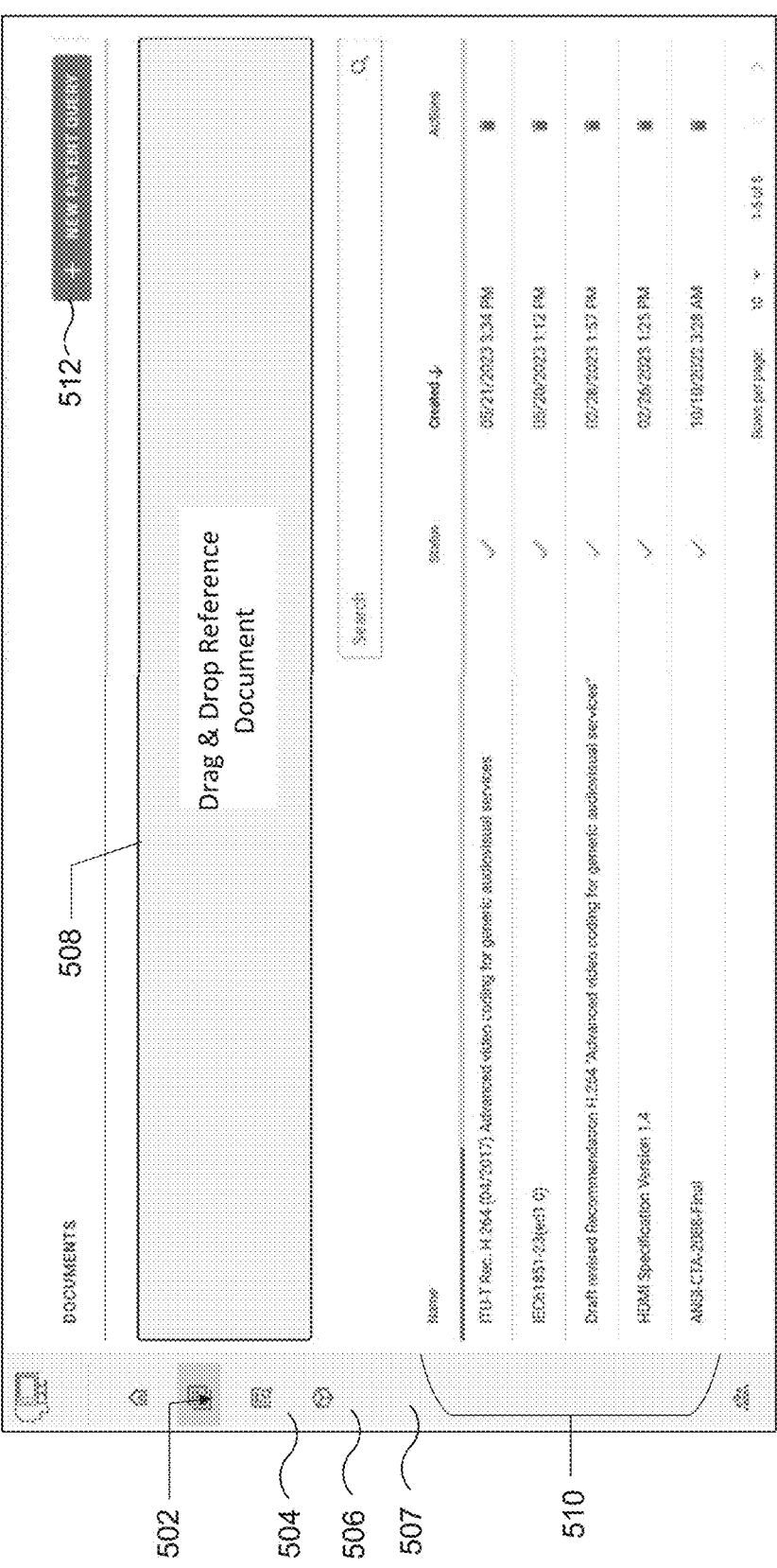
FIG. 5 is a diagram illustrating an example reference document page 500 displayed by the UI.

FIG. 5 is a diagram illustrating an example reference document page 500 displayed by UI 26. Once logged in, several pages are immediately available by clicking a menu 502 of icons in a bar displayed far left. The menu 502 displays a document list icon 504, a query list icon 506, and a custom domain icon 507, all of which relate to various resource list views that show resources of a given type.

Clicking on the document list icon 504 from any page displays the reference document page 500, which shows: i) a field 508 to drag and drop new documents to upload, ii) a list 510 of all reference documents that the user has uploaded to the application, and iii) a patent query button 512 to start a new query in a new query page.

Clicking the query list icon 506 from any page displays a query result page 700, which shows a list of all queries that have been performed by the user, and each of the queries in the list are links to a query detail page.

Figure 6:
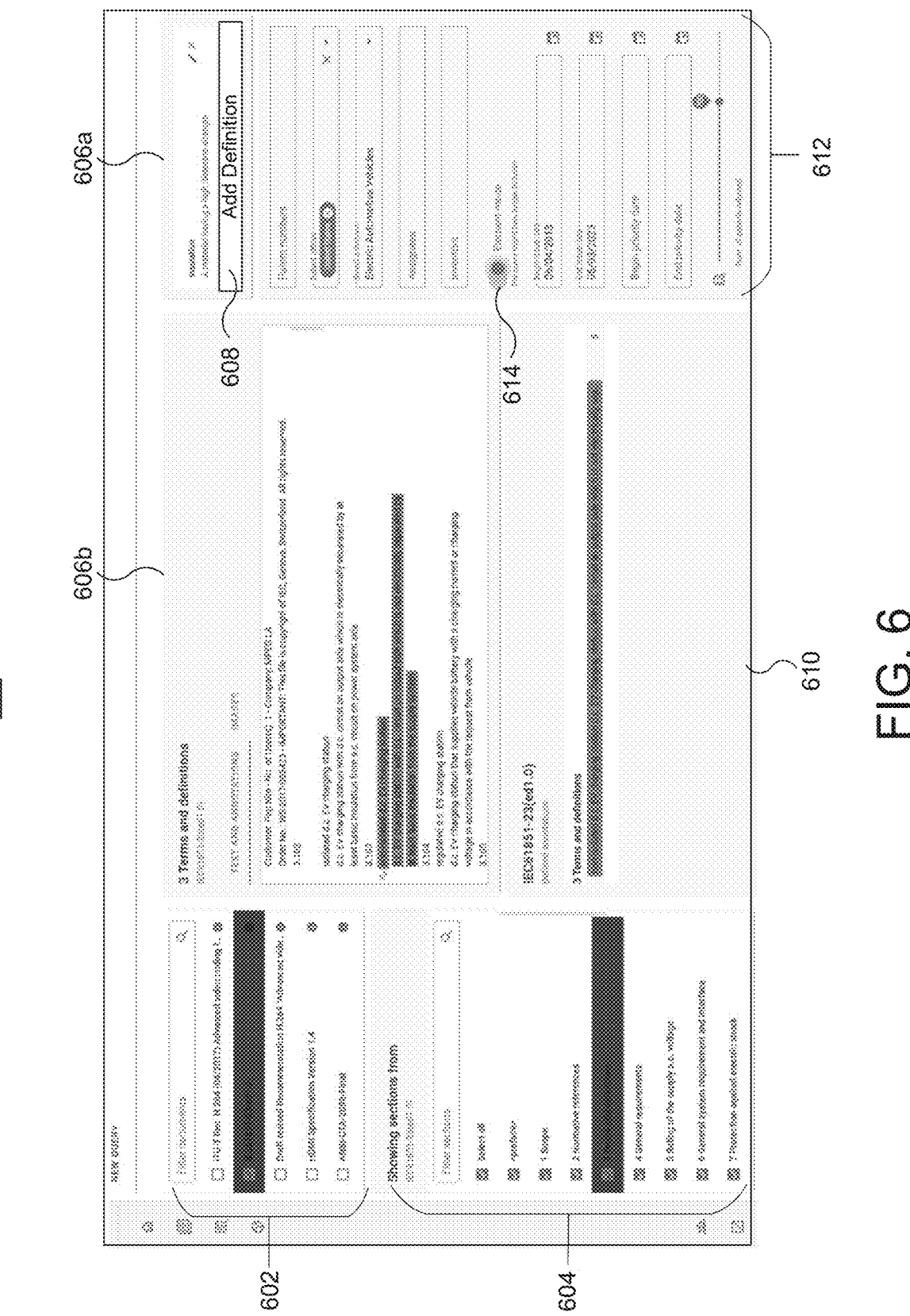
FIG. 6 is a diagram illustrating an example of the new query page 600 displayed by the UI.

The information in the both of these list views, as well as other information in table format, such as the list of previous queries, can be sorted by any of the column headers in the table. When the user hovers over a column heading a "carrot" will appear and when the user clicks the header, the table information is sorted by ascending or descending order. FIG. 6 is a diagram illustrating an example of the new query page 600 displayed by UI 26. Once one or more reference documents have been uploaded to the application, they may be used to conduct a patent query. A patent query is made using a selection of reference documents (and/or their subsections), along with several other parameters described below. The text of the reference documents serves as the query text, and controls which patents are retrieved from a patent database. More than one reference document can be selected for a query, in which case the text of the multiple documents will be concatenated.

To begin a new query, the user clicks the patent query button 512 at the top of either the reference document page 500 or the query results page 700. The new query page 600 then appears, which is used by the user to precondition or otherwise annotate a selected reference document to control the subsequent query. The new query page 600 enables the user to select one or more of the reference documents and other query parameters.

The new query page 600 includes a top left pane 602 showing a list of available reference documents, along with a search/filter bar. An information ("i") icon to the right of each document opens up a PDF viewer for the document. Checking the box to the left of the document selects the document for the query.

A bottom left pane 604 shows a list of the sections in the currently selected and highlighted document. By default, if a document is selected for the query, all sections of that document are selected. However, in the bottom left pane 604 the user can select one or more sections of the to use for the query. Checked boxes to the left of the sections indicate which section(s) of the document have been selected for the query.

According to one aspect of the disclosed embodiments, the new query page 600 includes top right pane 606a and top center pane 606b that enable the user to annotate the selected reference documents(s) with definitions and/or by giving a weight to a selected portion of text. Clicking on any document section in the lower left pane causes the text for that section to be displayed in a top-center pane 606b. In certain reference documents it is necessary to explain certain unique terminology or abbreviations in order to make the language in the reference document compatible with the patent literature. To do this, the top right pane 606a enables the user to add "definitions" by clicking an "add a definition" button 608. Clicking this button brings up a dialog asking for a "term" and a "definition", such that when the term is encountered in the reference document, the system will use the entered definition as the term's meaning.

The top middle pane 606b enables the user to select a portion of text (e.g., word, phrase, sentence, or paragraph(s)) and to select a weight to association with the selected portion of text. In the example shown, the user has selected text, which is highlighted. By the user right clicking on the selected text, a pop-up window is displayed that allows the user to enter a weight (e.g., 1-10) to the text that has the effect of giving that text more or less importance in the query process. If a number greater than one is given for the "weight" value in this window, the text is given additional importance in the query (roughly, the number is a multiplier, so if the number 10 is given, that text is considered 10 times more important than if it were not highlighted). If zero is given for the weight value, that text is ignored. Alternatively, the user may also indicate via a checkbox that the selected text is to be ignored during the query process. The annotations entered by the user are displayed in bottom middle pane 610.

Besides the sections themselves, along with the definitions and annotations, the new query page 600 displays a number of other query parameters 612 to enable the user to control the number and type of patents that will be returned by the query. The following describes the other query parameters 612:

Query Mode: Query mode button 614 enable the user to toggle between claim mode and element mode for the query. If element mode is selected, the application performs an element-by-element search to attempt to parse the elements from each independent claim in each patent and match each element to the given reference document. Then, the overall match score for the claim will be based on the minimum element score for that claim. In claim mode, the claim is not split into elements for the purposes of matching and the given match score is based on the claim as a whole rather than any given part.

Patent numbers: A comma-separated list of patent numbers can be entered by user for the query. This settings supersedes all other settings, and only this set of patents will be returned if it is provided.

Patent offices: The list of patent offices from which patents should be considered.

Domain: Displays a drop-down list of global and custom domains for selection by the user, which should match the domain of the reference document.

Begin and End Issue Date: The date range for the issue date of the patents to consider (no patent outside of this range will be returned)

Begin and End Priority Date: The date range for the earliest priority date of the patents to consider.

Assignees: A comma separated list of assignees. Returned patents will have one of the listed assignees.

Inventors: A comma separated list of inventors. Returned patents will have one of the listed inventors.

Begin and End Priority Date: The date range for the earliest priority date of the patents to consider.

Number of patents returned: The maximum number of patents that should be returned for this query.

Figure 7:
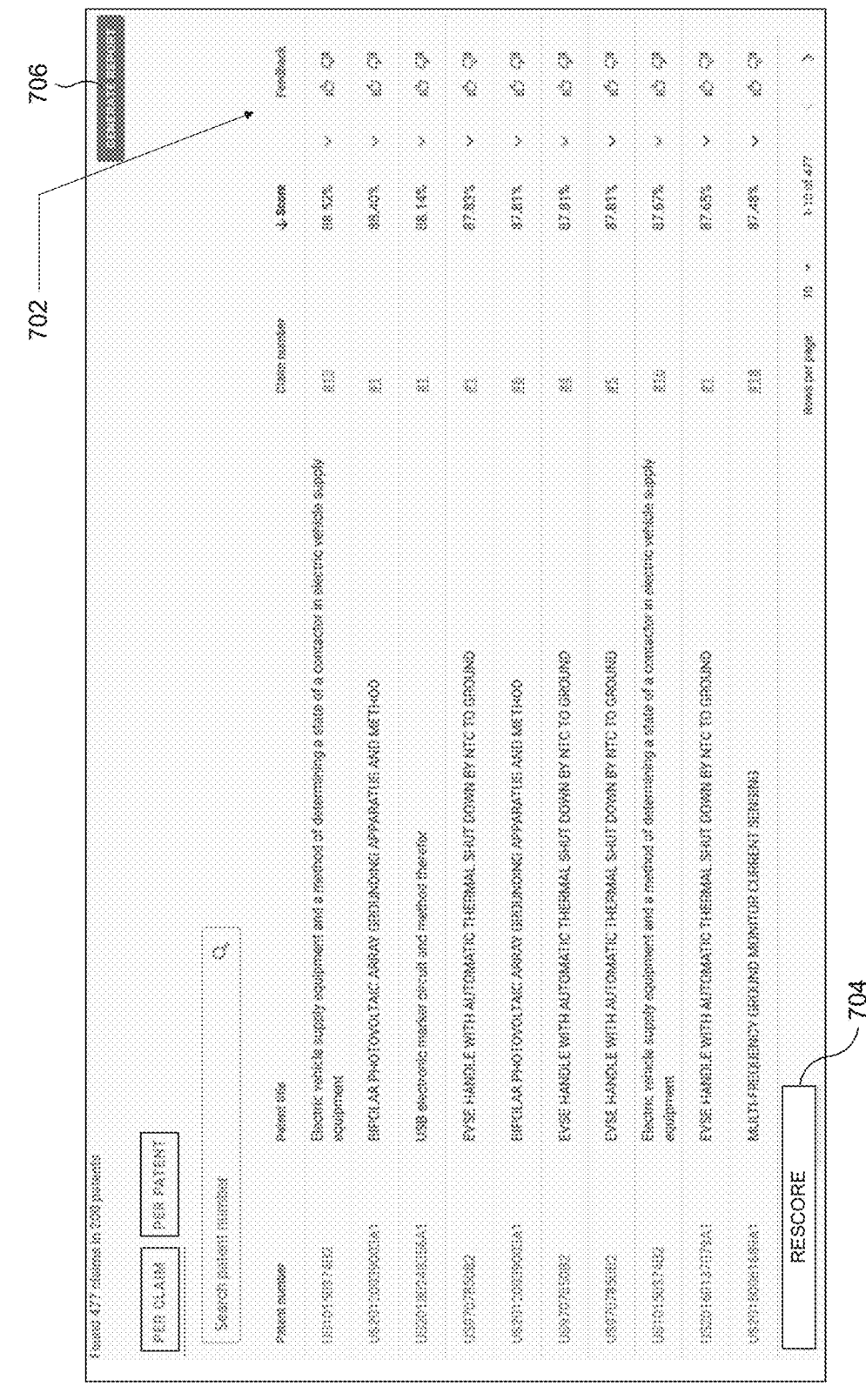
FIG. 7 is a diagram illustrating a query results page.

FIG. 7 is a diagram illustrating a query results page. The query results page 700 shows a table or list of patents returned as a result of a given query, along with corresponding confidence scores of the independent claims. Clicking on "Per Patent" and "Per Claim" tabs at the top of the page control whether to show the results for each matched independent claim, or the results for each patent, where the given score is the high score for the independent claims found in each patent. The listed patents may be identified by their patent numbers and titles, as shown.

In the query results page 700, the last column of the results table is a "feedback" column 702 that enables the application to accept feedback on the query results for reinforced learning. This feedback takes the form of a "thumbs up" or "thumbs down" icon next to each result. If the user clicks "thumbs up", the application is informed that the match between the patent claims and the reference document is a good result, and in the future, such similar results should be scored highly. Conversely, if the user clicks "thumbs down" is, the application is informed that this result is not relevant, and similar results should have low scores in the future.

To apply the feedback, a "Rescore query" button 704 is displayed at the bottom of the results list. When the user clicks the "Rescore query" button 704, a new query is run, which produces scores that reflect the changes to how the scores are generated based on the given feedback.

In one embodiment, the feedback for a given query is associated with the reference document, so that future queries against that document will have scores in line with the given feedback. To do a query against a "fresh" version of the reference document with no feedback, the user can upload a new copy of the same document and run a query against the copy of the document. Because the application treats different document copies as different documents, no feedback will be associated with the new copy.

The query results page 700 may also include a "Generate Report" button 706, which when clicked, saves the results table as a PDF or CSV file.

Figure 8:
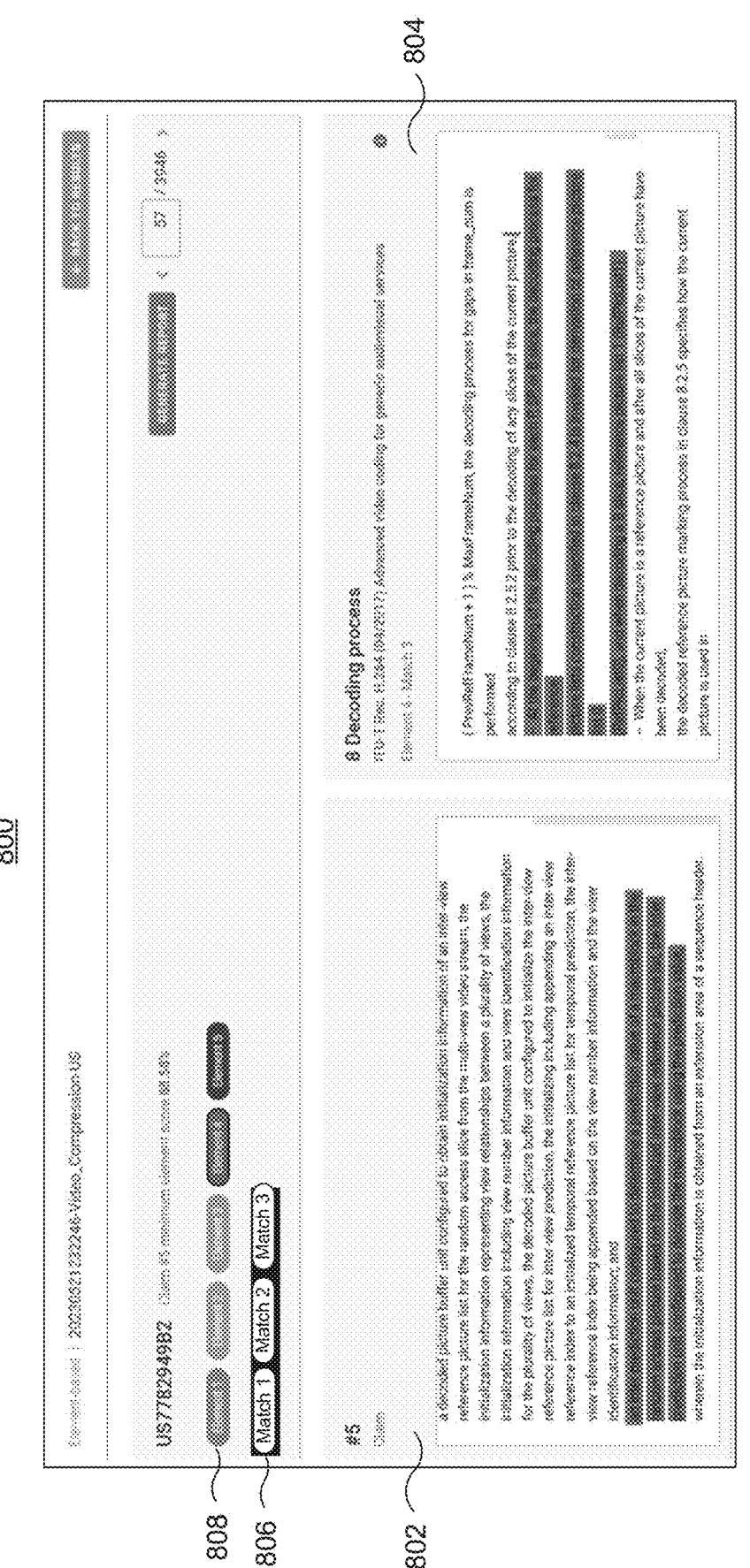
FIG. 8 is a diagram illustrating a claim detail page.

FIG. 8 is a diagram illustrating a claim detail page. The claim detail page 800 is displayed once the user clicks on the on a claim number displayed in the query results page 700 to view the match details. In both an element mode search and a claim mode search, a left pane 802 displays the entire claim text and a right pane 804 displays some sections of the reference document that are likely to match the subject matter of the claim. Clicking on "Match" buttons 806 displayed over the panes 802 and 804 show, in order of likelihood, sections of the document that were most likely to match the subject matter of the claim (that is, the Match 1 button shows the section most likely to match, the Match 2 button shows the second most likely match, and so on). Clicking on these Match buttons 806 displays the section in the right pane 804.

If the query was element-based, the claim detail page 800 displays element buttons 808 corresponding to different claim elements found in the claim. In one embodiment, the claim element buttons are highlighted in different colors. Clicking on one of element buttons 808 displays in the right pane 804 a document section considered to be most likely to contain the subject matter of that specific claim element. Clicking on "Match" buttons selects the section considered the second- and third-best matching section. The same color as the highlighted claim element is used to highlight the claim element in the claim displayed in the left pane 802 as well as matching text from the document section displayed in right pan 804. The claim elements are considered "in the context" of the entire claim and text of the patent.

A method and system for a hybrid artificial intelligence system for semi-automatic patent claims analysis has been disclosed. The present invention has been described in accordance with the embodiments shown, and there could be variations to the embodiments, and any variations would be within the spirit and scope of the present invention. The disclosed embodiments can be implemented using hardware, software, a computer-readable medium containing program instructions, or a combination thereof. Accordingly, many modifications may be made by one of ordinary skill in the art without departing from the spirit and scope of the appended claims.

The invention claimed is:

1. A computer-implemented method for implementing patent claims analysis by a set of instructions, which when executed by a computer causes the computer to perform operations comprising:

displaying a user interface to enable a user to initiate a search based on a selected reference document;

displaying options in the user interface that enable the user to narrow the search, the user interface operable to receive from the user a selection of one or more portions of the reference document to search against, and any tagged annotations for the reference document;

submitting a query to find a set of patents that are semantical similar to the reference document;

receiving a set of matching patents from the query;

inputting text of the reference document and the tagged annotations into a machine learning (ML) model to determine meanings of a first set of words in the reference document;

inputting text of at least a portion of the matching patents to the ML model to determine meanings of a second set of words in the matching patents;

searching the one or more portions of the reference document with claims from the matching patents to find matches between the claims and the one or more portions of the reference document based on the meanings of the first set of words and the tagged annotations, and the meanings of the second set of words;

assigning confidence scores indicating a degree to which respective ones of the claims match the one or more portions of the reference document;

generating a ranked set of the patents based on the confidence scores; and displaying identifiers of the ranked set of patents and the assigned confidence scores in the user interface.

2. The computer-implemented method of claim 1, further comprising: training a set of different ML models corresponding to different technology domains, wherein each ML model is trained using a dataset of between 2,000 to 10,000 patents from the corresponding technology domain.

3. The computer-implemented method of claim 2, further comprising: using one of the ML models to process the query that belongs to one of the different technology domains most closely related to a technology domain of the reference document.

4. The computer-implemented method of claim 3, further comprising: prior to running the query, displaying in the user interface a list of the different technology domains; and receiving a user selection of a particular one of the different technology domains to use.

5. The computer-implemented method of claim 2, further comprising: training each of the different ML models using a specific data set comprising words, phrases, and language associated with the corresponding technological domain.

6. The computer-implemented method of claim 5, further comprising: using patents as the specific data set.

7. The computer-implemented method of claim 2, further comprising: implementing the different technology domains as a plurality of global domains, and one or more user created custom domains, wherein the custom domains are trained using less data than the global domains and are created based upon information pulled from the reference document.

8. A computer-implemented method for performing patent claims analysis by software component, which when executed by a computer, cause the computer to perform operations comprising:

displaying a user interface to enable a user to initiate a search based on a selected reference document;

displaying options in the user interface that enable the user to narrow a focus of the search, the user interface operable to receive from the user a selection of one or more portions of the reference document to search against, and any tagged annotations for the reference document;

submitting a query to find a set of patents that are semantical similar to the reference document;

receiving a set of matching patents from the query;

inputting text of the reference document and the tagged annotations into a trained machine learning (ML) model to transform reference document into reference document embeddings to determine meanings of a first set of words in the reference document;

inputting text of the matching patents to the trained ML model to transform the set of matching patents, including claim elements, into patent embeddings to determine the meanings of a second set of words in the matching patents;

for at least a portion of the patents, performing, by the trained ML model, an element-by-element search to find matches between the claim elements and the one or more portions of the reference document based on the meanings of the first set of words and the meanings of the second set of words;

ranking the set of patents based on assigned confidence scores indicating a degree to which the patent embeddings of the respective claim elements match the reference document embeddings of the providing for viewing in the user interface a listing of the ranked set of patents, and for at least a portion of the set of patents, indications where matches occur between the claim elements and the one or more portions of the reference document.

9. The computer-implemented method of claim 8, wherein the tagged annotations indicate i) meanings of any acronyms found in the reference document, ii) definitions of words, iii) text having increased weight applied during the search, or any combination thereof.

10. The computer-implemented method of claim 9, further comprising: training a set of different ML models corresponding to different technology domains, wherein each ML model is trained using a dataset of between 2,000 to 10,000 patents from the corresponding technology domain.

11. The computer-implemented method of claim 10, further comprising: using one of the ML models to process the query that belongs to one of the different technology domains most closely related to a technology domain of the reference document.

12. The computer-implemented method of claim 11, further comprising: prior to running the query, displaying in the user interface a list of the different technology domains; and receiving a user selection of a particular one of the different technology domains to use.

13. The computer-implemented method of claim 10, further comprising: training each of the different ML models using a specific data set comprising words, phrases, and language associated with the corresponding technological domain.

14. The computer-implemented method of claim 13, further comprising: using patents as the specific data set.

15. The computer-implemented method of claim 10, further comprising: implementing the different technology domains as a plurality of global domains, and one or more user-created custom domains, wherein the custom domains are trained using less data than the global domains and are created based upon information pulled from the reference document.

16. An artificial intelligence (AI) system in communication with a client device over a network, the AI system to:

display a user interface to enable a user to initiate a search based on a selected reference document;

display options in the user interface that enable the user to narrow a focus of the search, the user interface operable to receive from the user a selection of one or more portions of the reference document to search against, and any tagged annotations for the reference document;

submit a query to find a set of patents that are semantical similar to the reference document;

receive a set of matching patents from the query;

input text of the reference document and the tagged annotations into a machine learning (ML) model to determine meanings of a first set of words in the reference document;

input text of at least a portion of the matching patents to the ML model to determine meanings of a second set of words in the matching patents;

search the one or more portions of the reference document with claims from the matching patents to find matches between the claims and the one or more portions of the reference document based on the meanings of the first set of words and the tagged annotations, and the meanings of the second set of words;

assign confidence scores indicating a degree to which respective ones of the claims match the one or more portions of the reference document;

generate a ranked set of the patents based on the confidence scores; and display identifiers of the ranked set of patents and the assigned confidence A device may display a user interface to enable a user to initiate a search based on a selected reference document.

\* \* \* \* \*